Nov. 7, 1961  J. B. SNOY  3,007,313
HYDRAULIC ONE-WAY CLUTCH
Filed March 24, 1958
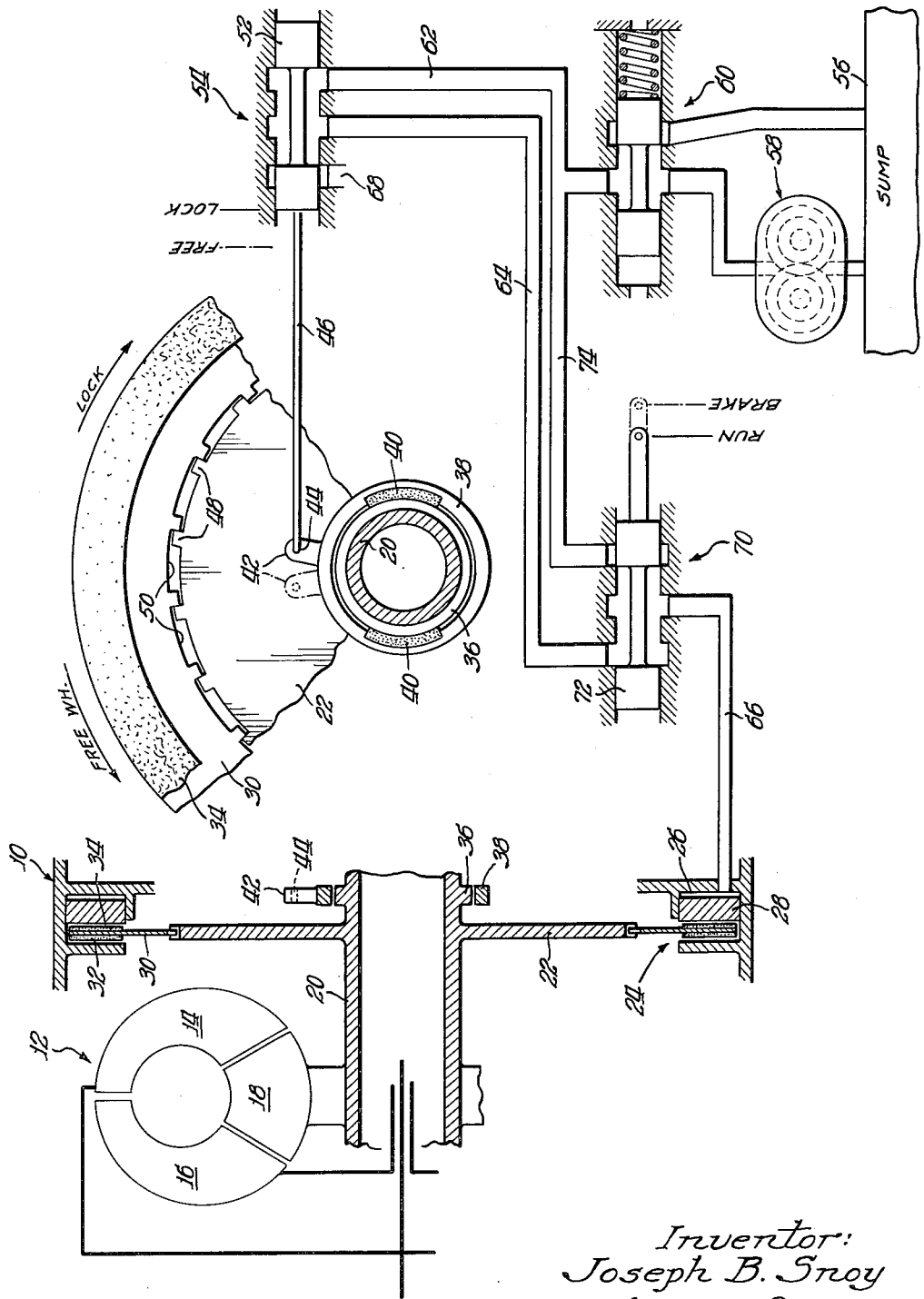
Inventor:
Joseph B. Snoy
By: Francis T. Drumm
Atty.

United States Patent Office 3,007,313
Patented Nov. 7, 1961

3,007,313
HYDRAULIC ONE-WAY CLUTCH
Joseph B. Snoy, Rockford, Ill., assignor to Borg-Warner Corporation, Chicago, Ill., a corporation of Illinois
Filed Mar. 24, 1958, Ser. No. 723,514
7 Claims. (Cl. 60—54)

This invention relates to one-way clutches or brakes and more particularly to a hydraulically actuated friction brake for locking the stator of a torque converter during converter range, and for permitting free rotation of the stator during coupling range.

This invention is primarily directed to a friction brake for locking the stator of the converter during converter range wherein hydraulic control means are provided for releasing the stator during coupling range and wherein manually actuatable means are provided for overriding the hydraulic control means to afford locking of the stator during coupling range to permit downhill braking.

A principal object of the invention is, therefore, to provide a hydraulic friction brake for selectively locking the stator of a torque converter during coupling range.

A further object of the invention is to provide a hydraulic friction brake of the stated type wherein means are provided for sensing the direction of reaction of the stator and for controlling the operation of the hydraulic friction brake in response to the sensing means.

A more particular object of the invention is to provide a hydraulic friction brake of the stated character wherein a reaction ring is engaged by the stator shaft and is moved to either the freewheel or lock position to position a hydraulic valve for controlling the flow of hydraulic fluid to the clutch or brake and wherein a manually actuatable valve is interposed between the control valve to override the control valve and to lock up the stator during coupling range.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

The sole figure is a diagrammatic view of a control system made in accordance with the present invention.

Referring now to the drawing, reference numeral 10 illustrates a transmission housing in which is mounted a converter 12 having an impeller 14, a turbine 16 and a stator 18. The stator 18 is shown as connected to a shaft 20 to which is connected a hub 22 for a friction brake 24. The friction brake 24 comprises an annular chamber 26 in which is slidably received an annular piston 28 which is movable to the left, as illustrated in the drawing, by the force of hydraulic fluid received within the chamber 26 in a manner hereinafter apparent, to engage an annular plate 30 having at opposite surfaces thereof friction facings 32 and 34. The fluid under pressure urges the plate 30 into engagement with the housing 10 for locking the stator 18, as will be understood.

It will be noted that the reaction of the stator 18 is in one direction during converter range and in the opposite direction during coupling range. As illustrated on the right side of the drawing, the stator reaction is in a clockwise direction during converter range and in counterclockwise direction during coupling range. According to the present invention, means are provided for sensing the direction of reaction of the stator 18 and for controlling the flow of pressure fluid accordingly. In the present instance, a drum 36 is connected to the shaft 20 and is surrounded by a reaction ring 38 having at the inner periphery thereof friction blocks 40. The reaction ring 38 is shown as provided with a lug 42 having an opening 44 in which is received one end of a link 46. The link 46 may be moved from the "lock" position shown to the free-wheel position shown in dot-and-dash lines by the gripping action of the friction blocks 40. To assure this movement, the outer periphery of the hub 22 is provided with circumferentially spaced lugs 48 while the inner periphery of the plate 30 is provided with lost motion slots 50. Movement of the link 46 positions plunger 52 of a control valve 54 to which fluid is supplied from a sump 56 by means of a pump 58, a pressure regulating valve 60 and a conduit 62. In the illustrated position of the plunger 52, fluid under pressure is permitted to flow through the conduit 62 and thence through conduit 64 and 66 to actuate the piston 28 to lock the friction brake 24.

When the converter 12 has reached coupling range, the reaction of the stator 18 is in the opposite direction, the reaction ring 38 is moved to the position shown in dot-and-dash lines, the plunger 52 is moved to the "free" position so that the conduit 62 is blocked and the chamber 26 is vented through conduits 66, 64 and an exhaust port 68.

According to the present invention, manually actuatable means are provided to transmit fluid under pressure to the chamber 26 during the coupling range of the converter 12 for purposes of downhill braking. To this end, a manual valve 70 having a plunger 72 is provided. The plunger 72 is slidable from the "Run" position illustrated to the "Brake" position illustrated in dot-and-dash lines by any suitable mechanical expedient. When the plunger 72 is moved to the "Brake" position, the conduit 64 is blocked and communication is afforded between the conduit 62 and the chamber 26 by means of a conduit 74 and the conduit 66. By this arrangement, the automatic control afforded by the control valve 54 is overridden by the manual valve 70 so that the brake 24 may be selectively engaged during coupling range to permit downhill braking.

The control apparatus of the above-described invention exhibits important advantages over converter stator controls now known. The conventional way to control the operation of a stator is to utilize a one-way brake which locks the stator during converter range and permits free wheeling of the stator during coupling range. A disadvantage of this arrangement is that there is no appreciable stator reaction during the coupling range of the converter and braking of the vehicle is difficult.

While I have described my invention in connection with certain specific constructions and arrangements, it is to be understood that this is by way of illustration and not by way of limitation and the scope of my invention is defined solely by the appended claims which should be construed as broadly as the prior art will permit.

I claim:
1. A control apparatus for a torque converter having an impeller, a turbine and a stator comprising a hydraulically actuated friction brake for said stator, a valve operative in response to reverse reaction of fluid against said stator for normally supplying hydraulic fluid to said brake actuator to arrest said stator and afford reaction during converter range and in response to forward reaction of fluid against said stator for exhausting fluid from said brake actuator to permit freewheeling during coupling range, and manually actuatable means for selectively overriding said valve to afford locking of said stator during coupling range.

2. A control apparatus for a torque converter having an impeller, a turbine, and a stator, said stator being mounted on a shaft and controlled by a hydraulically actuated friction brake, said apparatus comprising means providing a fluid source, a pump and a pressure regulator for supplying fluid to said brake actuator, a valve for controlling the flow of fluid to said brake actuator, means responsive to a change in the direction of stator reaction and a slight angular displacement of said stator for actuating said valve to supply fluid to or release fluid from said brake actuator, said valve being interconnected with said actuator means so that upon a slight angular displacement of said actuator means said valve member may be moved between its operative positions, and manually actuatable means for suppling fluid to said brake actuator when said valve is in release position to effect stator reaction in the coupling range for braking the coupling turbine.

3. A control apparatus in accordance with claim 2 wherein said actuator means includes a reaction ring frictionally connected to the stator shaft for angular movement, and a link movable by said reaction ring for positioning said valve to supply fluid to said brake actuator during converter range and for exhausting fluid from said brake actuator to release said brake during coupling range.

4. A control apparatus in accordance with claim 2 wherein said manually actuable means includes a valve for bypassing said control valve.

5. A control apparatus for a torque converter having an impeller, a turbine and a stator mounted on a shaft, comprising a brake automatically actuatable to lock said stator shaft while in converter range and to release said stator shaft while in coupling range, said brake including a hub, a plurality of circumferentially spaced lugs on the periphery of said hub, an annular plate having at the inner periphery of which a plurality of lost motion slots in each of which one of said lugs is received, friction surfaces on each side of said annular plate, means forming a chamber, an annular piston slidably mounted in said chamber and adapted frictionally to engage said plate; control means for said brake, said control means including a reaction ring frictionally connected to said shaft, a valve for controlling the flow of fluid to said brake chamber, a link connecting said reaction ring to said valve so that said valve is positioned in accordance with the direction of reaction of said stator and manually actuatable means for locking said stator during coupling range.

6. A control apparatus for a torque converter having an impeller, a turbine and a stator mounted on a shaft, comprising a brake automatically actuatable to lock said stator shaft while in converter range and to release said stator shaft while in coupling range, said brake including a hub, an annular plate mounted in surrounding relation to said hub, means affording limited relative rotation between said hub and said plate, said means including a plurality of circumferentially spaced lugs on the periphery of said hub, said annular plate having at the inner periphery of which a plurality of lost motion slots in each of which one of said lugs is received, means forming a chamber, an annular piston slidably mounted in said chamber and adapted frictionally to engage said plate; control means for said brake, said control means including a reaction ring frictionally connected to said shaft, a valve for controlling the flow of fluid to said brake chamber, a link connecting said reaction ring to said valve so that said valve is positioned in response to change in direction of reaction of said stator, and manually actuatable means for selectively locking said stator during coupling range.

7. A torque converter having an impeller, a turbine and a stator mounted on a shaft, means for locking said stator during converter range and for automatically releasing said stator during coupling range, said means comprising a reaction ring frictionally connected to the shaft of said stator for sensing a change in direction of reaction of said stator and wherein said first-named means includes a hydraulically actuated friction brake and a valve for controlling the supply of fluid to said brake actuator and wherein a link connects said reaction ring to said valve for positioning said valve in accordance with stator reaction to supply fluid to said brake actuator or exhaust fluid therefrom, and means for overriding said first-named means when locking is desired in coupling range.

References Cited in the file of this patent

UNITED STATES PATENTS

| | | |
|---|---|---|
| 2,332,593 | Nutt et al. | Oct. 26, 1943 |
| 2,416,129 | Swift | Feb. 18, 1947 |
| 2,521,117 | Du Bois et al. | Sept. 5, 1950 |
| 2,697,330 | Odman | Dec. 21, 1954 |